US012670401B2

(12) United States Patent
Tanaka et al.

(10) Patent No.: US 12,670,401 B2
(45) Date of Patent: Jun. 30, 2026

(54) SYSTEMS AND METHODS FOR NORMALIZATION IN DEEP LEARNING

(71) Applicant: NTT RESEARCH, INC., Sunnyvale, CA (US)

(72) Inventors: Hidenori Tanaka, Sunnyvale, CA (US); Ekdeep Singh Lubana, Sunnyvale, CA (US)

(73) Assignee: NTT RESEARCH, INC., Sunnyvale, CA (US)

( * ) Notice: Subject to any disclaimer, the term of this patent is extended or adjusted under 35 U.S.C. 154(b) by 567 days.

(21) Appl. No.: 18/207,949

(22) Filed: Jun. 9, 2023

(65) Prior Publication Data

US 2023/0401448 A1      Dec. 14, 2023

Related U.S. Application Data

(60) Provisional application No. 63/350,820, filed on Jun. 9, 2022.

(51) Int. Cl.
G06N 3/084          (2023.01)
G06N 3/0464         (2023.01)

(52) U.S. Cl.
CPC ........... G06N 3/084 (2013.01); G06N 3/0464 (2023.01)

(58) Field of Classification Search
CPC ....... G06N 3/084; G06N 3/0464; G06N 3/048
See application file for complete search history.

(56) References Cited

U.S. PATENT DOCUMENTS

| | | | | |
|---|---|---|---|---|
| 6,442,535 B1 * | 8/2002 | Yifan | ................... | H02P 25/092 |
| | | | | 310/168 |
| 9,530,042 B1 * | 12/2016 | Saeed | ................... | G06F 16/583 |
| 10,354,184 B1 * | 7/2019 | Vitaladevuni | ......... | G06N 3/082 |
| 11,113,578 B1 * | 9/2021 | Brandt | ............... | G06F 18/2411 |
| 11,232,016 B1 * | 1/2022 | Huynh | ............... | G06F 11/1004 |
| 11,423,303 B1 * | 8/2022 | Jiao | ........... | G06N 3/08 |
| 11,494,321 B1 * | 11/2022 | Yu | ........... | G06F 9/30043 |
| 11,941,784 B1 * | 3/2024 | Ikuta | ........... | G06N 3/08 |
| 11,961,619 B1 * | 4/2024 | LaBorde | ................. | G06N 3/02 |
| 12,020,265 B1 * | 6/2024 | Mao | ........... | G06F 40/30 |
| 12,175,222 B1 * | 12/2024 | Benfield | ............... | G06N 3/048 |
| 12,400,106 B1 * | 8/2025 | Diamant | ............... | G06N 3/045 |
| 2004/0044503 A1 * | 3/2004 | McConaghy | ........... | G06F 30/00 |
| | | | | 703/2 |
| 2005/0147047 A1 * | 7/2005 | Monk | ................. | H04L 43/0847 |
| | | | | 370/254 |
| 2005/0288812 A1 * | 12/2005 | Cheng | ............. | G05B 19/41875 |
| | | | | 700/109 |
| 2016/0085430 A1 * | 3/2016 | Moran | ............. | H04M 1/72454 |
| | | | | 715/765 |

(Continued)

*Primary Examiner* — Aravind K Moorthy
(74) *Attorney, Agent, or Firm* — DLA Piper LLP US

(57) ABSTRACT

A method of training a neural network may be provided. The method may include receiving a raw data set and normalizing the raw data set using a group normalization layer to generate a training data set for training a neural network, wherein the group normalization layer segments the raw data set into a plurality of groups of a predetermined size. The method may also include randomly initializing the neural network by randomly assigning values to a plurality of weights corresponding to a plurality of layers of the neural network. The method may further include training the neural network using the training data set.

20 Claims, 3 Drawing Sheets

100

(56) References Cited

U.S. PATENT DOCUMENTS

| | | | |
|---|---|---|---|
| 2018/0088996 A1* | 3/2018 | Rossi | G06F 9/5016 |
| 2018/0137857 A1* | 5/2018 | Zhou | G10L 15/16 |
| 2019/0164050 A1* | 5/2019 | Chen | G06N 3/084 |
| 2019/0188567 A1* | 6/2019 | Yao | G06N 3/082 |
| 2019/0251723 A1* | 8/2019 | Coppersmith, III | G06T 11/60 |
| 2019/0311268 A1* | 10/2019 | Tilton | G06N 3/084 |
| 2019/0340543 A1* | 11/2019 | Gerenstein | G06Q 10/04 |
| 2019/0362236 A1* | 11/2019 | Wang | G06N 3/0464 |
| 2020/0004815 A1* | 1/2020 | Weisberg | G06N 5/046 |
| 2020/0065677 A1* | 2/2020 | Iriarte Lopez | G06N 3/09 |
| 2020/0132547 A1* | 4/2020 | Yu | G01J 3/02 |
| 2020/0175360 A1* | 6/2020 | Conti | G06F 16/23 |
| 2020/0303078 A1* | 9/2020 | Mayhew | G16B 25/10 |
| 2020/0311522 A1* | 10/2020 | Tzoufras | G06N 3/084 |
| 2021/0142151 A1* | 5/2021 | Mixter | G06F 17/18 |
| 2021/0158132 A1* | 5/2021 | Huynh | G06N 3/0464 |
| 2021/0168165 A1* | 6/2021 | Alsaeed | G06N 20/00 |
| 2021/0174196 A1* | 6/2021 | Desmond | G06N 3/08 |
| 2021/0256386 A1* | 8/2021 | Wieman | G06N 3/084 |
| 2021/0357744 A1* | 11/2021 | Mittal | G06N 3/0985 |
| 2021/0397943 A1* | 12/2021 | Ribalta | G06N 3/09 |
| 2022/0012860 A1* | 1/2022 | Zhang | G06T 5/77 |
| 2022/0061746 A1* | 3/2022 | Lyman | G16H 30/20 |
| 2022/0075659 A1* | 3/2022 | Mohapatra | G06N 3/063 |
| 2022/0084732 A1* | 3/2022 | Liu | H02P 21/001 |
| 2022/0114390 A1* | 4/2022 | Baughman | G10L 19/167 |
| 2022/0147792 A1* | 5/2022 | Jiao | G06N 3/0495 |
| 2022/0189612 A1* | 6/2022 | Zhai | G06N 3/082 |
| 2022/0198011 A1* | 6/2022 | Kumar | G06F 21/554 |
| 2022/0237465 A1* | 7/2022 | Lewis | G06N 3/0442 |
| 2022/0327408 A1* | 10/2022 | Meng | G06N 3/088 |
| 2022/0366532 A1* | 11/2022 | Shanmuga Vadivel | G06T 3/4046 |
| 2022/0408698 A1* | 12/2022 | Du | G06N 3/08 |
| 2023/0098994 A1* | 3/2023 | Labatie | G06N 3/08 706/25 |
| 2023/0106639 A1* | 4/2023 | Wagener | G06N 3/04 726/1 |
| 2023/0156025 A1* | 5/2023 | Bracht | H04L 63/145 726/22 |
| 2023/0215460 A1* | 7/2023 | Shiloh Perl | G10L 25/51 704/200 |
| 2024/0331371 A1* | 10/2024 | Chen | G06V 10/82 |

* cited by examiner

*100*

200

RECEIVE RAW DATA SET                                                    202

NORMALIZE RAW DATA USING A GROUP NORMALIZATION LAYER TO
GENERATE TRAINING DATA SET                                             204

RANDOMLY INITIALIZE NEURAL NETWORK                                     206

TRAIN THE NEURAL NETWORK USING THE TRAINING DATA SET                   208

SYSTEMS AND METHODS FOR NORMALIZATION IN DEEP LEARNING

CROSS REFERENCE TO RELATED APPLICATIONS

This application claims priority to U.S. Provisional Application No. 63/350,820, filed Jun. 9, 2022, which is hereby incorporated by reference in its entirety.

FIELD OF DISCLOSURE

This disclosure relates to training neural networks, and more particularly relates to application of normalization methods in training the neural networks.

BACKGROUND

Normalization techniques are often used to effectively train deep neural networks. Normalization techniques generally stabilize the training process. For example, a popular normalization technique is batch normalization, which has several beneficial properties that allow it to stabilize a deep neural network's training dynamics. For instance, batch normalization may provide an ability to propagate informative activation patterns in deeper layers, reduce dependence on initialization, facilitate faster convergence via removal of outlier eigenvalues, auto-tune learning rate, and allow for smoothing of loss landscape. However, depending on the application scenario, batch normalization may have limited benefits or may even cause hindrances. For instance, batch normalization struggles when training with small batch-sizes. In settings with train-test distribution shifts, batch normalization can undermine a model's accuracy. In meta-learning, batch normalization can lead to transductive inference. In adversarial training, batch normalization can hamper accuracy on both clean and adversarial examples by estimating incorrect statistics.

SUMMARY

In some embodiments, a method of training a neural network may be provided. The method may include receiving a raw data set and normalizing the raw data set using a group normalization layer to generate a training data set for training a neural network, wherein the group normalization layer segments the raw data set into a plurality of groups of a predetermined size. The method may also include randomly initializing the neural network by randomly assigning values to a plurality of weights corresponding to a plurality of layers of the neural network. The method may further include training the neural network using the training data set.

In some embodiments, a system may be provided. The system may include a non-transitory storage medium storing computer program instructions and one or more processors configured to execute the computer program instructions to cause operations. The operations may include receiving a raw data set and normalizing the raw data set using a group normalization layer to generate a training data set for training a neural network, wherein the group normalization layer segments the raw data set into a plurality of groups of a predetermined size. The operations may also include randomly initializing the neural network by randomly assigning values to a plurality of weights corresponding to a plurality of layers of the neural network. The operations may further include training the neural network using the training data set.

DESCRIPTION

Embodiments disclosed herein provide a group normalization, implemented by one or more group normalization layers, during a random initialization stage of a neural network. This technique of group normalization may not have the above-discussed drawbacks of batch normalization. Furthermore, as discussed below, the group normalization layers may prevent an explosion of activation variance during forward propagation and avoid a gradient explosion during backpropagation. Additionally, the group normalization layers may prevent a rank collapse within at least one internal layer of the neural network. Avoiding these anomalies may facilitate a stable, manageable training of the neural network.

Figure 1:
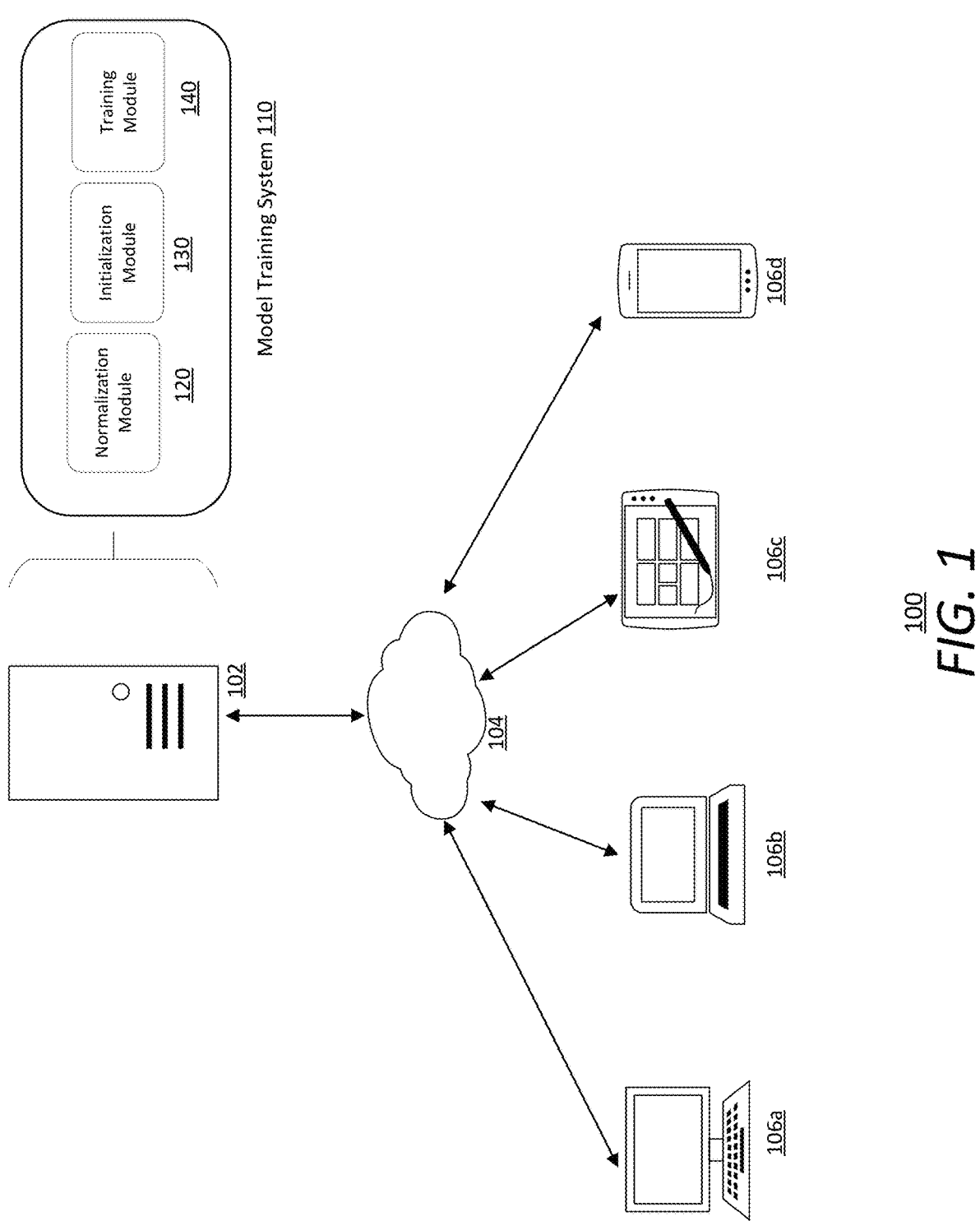
FIG. 1 shows an illustrative system configured to train a neural network, according to example embodiments of this disclosure.

FIG. 1 shows an illustrative system 100 configured to train a neural network, according to example embodiments of this disclosure. As shown, the system 100 may be based on a client-server model, with a server 102 connected to multiple clients 106a-106d (commonly referred to as a client 106 or collectively referred to as clients 106) via a network 104. It should, however, be understood that the client-server model is just for illustration and ease of explanation and should not be considered limiting. Therefore, any type of system configured to perform the functionality disclosed herein should be considered within the scope of this disclosure. Furthermore, the individual components of the systems 100 are just illustrative and systems with alternative, additional, or fewer number of components should be considered within the scope of this disclosure.

The system 100 may generally be used in a setting such as an enterprise, research facility, etc. where the training of neural networks (e.g., convolutional neural networks, deep neural networks, etc.) is a desired functionality. In some example use cases, the server 102 may store different software modules that may be accessed by the clients 106 using the network 104. The clients 106 themselves may have standalone applications (not shown) to access the software modules. Alternatively, the clients 106 may access the software modules through a browser application, for example.

The hardware of the server 102 may be representative any kind of computing device. For example, the server 102 may include any kind of computing device, including but not limited to a server computer, a desktop computer, a laptop computer, a tablet computer, a smartphone. The server 102 may not necessarily be at a single location and may be realized by a network of computers. Furthermore, the server 102 may not necessarily be co-located within an enterprise or research setting itself, and may be hosted by a third party cloud computing provider. Therefore, any kind of server 102 should be considered within the scope of this disclosure.

As described above, the clients 106 may access the server 102 through the network 104. The network 104 may include any combination of one or more packet switching networks (e.g., an IP based network) and one or more circuit switching networks (e.g., a cellular telephony network). Some non-limiting examples of the network 104 include a local area network, a metropolitan area network, a wide area network such as the Internet, etc. Similarly, non-limiting examples of the clients 106 may include a desktop terminal (e.g., desktop terminal 106a), a laptop computer (e.g., a laptop computer 106b), a tablet computer (e.g., a tablet computer 106c), a smartphone (e.g., a smartphone 106d), etc. Any type of computing device that allows an access to the server 102 through the network 104 should be considered within the scope of this disclosure. Furthermore, the functionality described within this disclosure can be distributed in any fashion, i.e., functionality of the server 102 may be performed by one or more clients 106 and vice versa.

The server 102 may include a model training system 110 configured to train a neural network. In some embodiments, the model training system 110 may include one or more software modules implementing the training functionality. As shown, the model training system 110 may include a normalization module 120, an initialization module 130, and a training module 130. The normalization module 120 may normalize a raw data set using one or more group normalization layers. The one or more group normalization layers may segment the raw data set into a plurality of groups of a predetermined size. The segmented data may form training data set. The initialization module 130 may randomly initialize the neural network by randomly assigning values to a plurality of weights corresponding to a plurality of layers of the neural network. That is, the normalization of the raw data by the normalization module 120 and initialization by the initialization module 130 may be performed prior to training the neural network. The training module 140 may then train the neural network using the training dataset.

In some embodiments, the group normalization layers implemented by the normalization module 120 may be based on the following analytical modeling. For example, operators $\mu_{\{d\}}(T)$ and $\sigma_{\{d\}}(T)$ may defined, where the operators may calculate, respectively, mean and standard deviation of a tensor T along the dimensions {d} (e.g., height, width, channel) of the data set. In some embodiments, the data set may include raw data set to be normalized for training a neural network. $\|T\|$ may denote $l_2$ norm of T. $RMS_{\{d\}}(T)$ may denote the root mean square of T along dimensions specified by dimensions {d}. For example, for vector $v \in R^n$, $$RMS_{\{1\}}(v) = \sqrt{\left(\Sigma_i v_i^2/n\right)}.$$

An assumption may be made that the outputs of these operators are propagated to subsequent layers. In some embodiments, the propagation to subsequent layer may be based on a sigmoid function $\rho(\cdot)$. Symbols b, c, x may be defined to denote the batch, channel, and spatial dimensions (e.g., within {d}), respectively. For feature maps in a convolutional neural network, x may include both the height and the width dimensions. The notation c g may denote division of c neurons (or channels) into groups of size g. For the group normalization, each group may be normalized independently. In some embodiments, the size g may be predetermined. For example, the size g may be based on the desired training stability and training speed, which may involve a tradeoff. Therefore, based on a user's preference training speed may be increased lowering the training stability, or the training stability may be increased lowering the training speed; and g may be established to have a desired mix of training speed and training stability.

In some embodiments, the group normalization layers implemented by the normalization module 120 may avoid exponential growth of variance during forward propagation of signals through the neural network. For example, the normalization module 120 may utilize the normalization layers to normalize data sets in training a residual neural network (ResNet). Within a ResNet, assuming that the $L^{th}$ residual path ($f_L$) may be processed by a group normalization layer N, after which it may combine with a skip connection to generate the next output: $y_L = y_{L-1} + N_L(f_L (y_{L-1}))$. In some embodiments, the covariance of layer input and a residual path's output may be assumed as zero. Hence, the output's variance may be: $Var (y_L) = Var (y_{L-1}) + Var (N_L(f_L(y_{L-1})))$. Assuming a group normalization with a group size g is used for normalizing the d-dimensional activation signal, i.e., normalized data set=group normalized (GN) data set with predetermined group size g. This may imply that, for a group, $\sigma_{g,x}(GN(f_L (y_{L-1}))) = 1$. Then, for a batch of size N, denoting the $i^{th}$ sample activations as $$y_L^{(i)},$$

and using $$(y_L^{(i)})^j$$

to index activations, the residual output's variance may average along the spatial dimensions by:

$$\langle Var(N(f_L(y_L - 1))) \rangle = \frac{1}{D}\sum_{j=1}^{D}(\frac{1}{N}\sum_{i=1}^{N}(GN(f_L(y_{L-1}^{(i)}))^j)^2) =$$

$$\frac{1}{N}\sum_{i=1}^{N}(\frac{1}{D}\sum_{j=1}^{D}(GN(f_L(y_{L-1}^{(i)}))^j)^2) =$$

$$\frac{1}{N}\sum_{i=1}^{N}\frac{G}{D}\sum_{g=1}^{D/G}(\sigma_{g,x}(GN(f_L(y_{L-1}^{(i)}))))^2) = 1.$$

Overall, this may imply that $\langle Var (y_L) \rangle = \langle Var (y_{L-1}) \rangle + 1$. Recursively applying this relationship, a bounded variance input, the average variance at the $L^{th}$ layer may be in the order of O(L). Thus, use of group normalization may provide stable forward propagation in ResNets by ensuring that activation variance grows linearly with depth. Therefore, the group normalization layers may cause a linear growth of activation variance during a forward propagation in neural networks such as ResNets. In some embodiments, the linear growth in ResNets may be caused by a non-linearity in a residual path. Although the above discussion uses ResNet as an example, the prevention of activation variance explosion by the group normalization layers may be applicable to any type of neural network.

Additionally, the group normalization layers implemented by the normalization module 120 may prevent a rank collapse within at least one internal layers of the neural network. A rank collapse may occur when activations for different input samples become indistinguishably similar in deeper layers. This can significantly slow training as the gradient updates no longer reflect information about the input data. Therefore, the neural network may have to generate dissimilar activations, particularly in the deeper layers, to avoid rank collapse. Specifically, given a randomly initialized network that uses a specific normalization technique, its average cosine similarity of activations at the penultimate layer (i.e., layer before the linear classifier) may be related with its mean training accuracy, which may be represented as $$\frac{\sum_{i=1}^{\# no \ of \ epochs} Train \ Acc.[i]}{\# \ of \ epochs},$$

a measure of optimization speed.

To avoid rank collapse, activations generated by a randomly initialized neural network may have to have a high rank, i.e., different samples may have sufficiently different activations. To show this, the activations for N samples at the penultimate layer, $Y \in R^{width+N}$, may be considered, and the covariance matrix $YY^T$, whose rank is equal to that of the similarity matrix $Y^TY$, may be defined. In a zero-mean, randomly initialized network with the batch normalization layers, the covariance matrix may have a rank at least as large as $\Omega$ ($\sqrt{width}$). That is, there may be at least $\Omega$ ($\sqrt{width}$) distinct directions that form the basis of the similarity matrix, hence indicating the neural network may be capable of extracting informative activations.

Using the group normalization layers-instead of batch normalization layers-on a zero-mean, randomly initialized neural network, the penultimate layer activations may have a rank of at least $\Omega$ $$(\sqrt{\frac{width}{Group \ Size}}),$$

where width denotes the layer-width (e.g., number of channels in Group Size a convolutional neural network). It is known from random matrix theory that multiplication of several zero-mean, randomly initialized Gaussian matrices may result in a rank-one matrix. Using a batch normalization may cause that on multiplication with a randomly initialized weight matrix, the values of on-diagonal elements of the covariance matrix $YY^T$ are preserved, while the off-diagonal elements are suppressed. This may leads to a lower bound of the order of $\Omega$ ($\sqrt{width}$) on the stable rank of the covariance matrix. If group normalization layers-instead of the batch normalization layers—are used on the similarity matrix $Y^TY$, a similar preservation and suppression of on- and off-diagonal matrix blocks may occur. Here, the block size may be equal to the group size used for the group normalization. This indicates the lower bound may be in $\Omega$ $$(\sqrt{\frac{width}{Group \ Size}}),$$

In some embodiments, the group normalization layers implemented by the normalization module 120 cause the neural network to avoid gradient explosion during a backward propagation. For comparison, gradient explosion of backpropagation may first be considered for batch normalization. For example, in the batch normalization technique, a gradient of loss with respect to activations at layer L, denoted as $Y_L \in R^{d_L*N}$, may be calculated. Two sets of intermediate variables may be defined: (i) pre-activations, generated by weight multiplication, $X_L = W_L Y_{L-1}$ and (ii) normalized pre-activations, generated by batch normalization BN), $$\hat{X}_L = BN(X_L) = \frac{\gamma}{\sigma_{\{N\}}(X_L)}(X_L - \mu_{\{N\}}X_L)) + \beta.$$

Under these notations, the gradient backpropagated from layer L to layer L−1 is may be:

$$\nabla_{Y_{L-1}} (J) = \frac{\gamma}{\sigma_{\{N\}}(X_L)} W_L^T P[\nabla_{\hat{X}_L} (J)].$$

Here P is a composition of two projection operators:

$$\mathcal{P}[Z] = \mathcal{P}_{1_N}^+ \left[ \mathcal{P}_{Ob(\hat{x}_L/\sqrt{N})}^\perp [Z] \right].$$

The operator $$\mathcal{P}_{Ob(\hat{x}_L/\sqrt{N})}^\perp [Z] = Z - \frac{1}{N} diag\left( Z \hat{X}_L^T \right) \hat{X}_L$$

may subtract its input's component that is inline with the batch normalization via projection onto the oblique manifold $$diag\left( \left( \frac{1}{N} \hat{x}_i \hat{x}_i^T \right) \right) = diag(1).$$

Similarly, $$\mathcal{P}_1^+[Z] = Z\left( I - \frac{1}{N} 1_N 1_N^T \right)$$

may mean-centers its input along the batch dimension via projection onto $1_N \in R^N$. At initialization, the gradient may unlikely to have a large component along specific directions such as the all-ones vector (1) or the oblique manifold defined by $\widehat{X_L}$. Thus, the gradient norm may remain essentially unchanged when propagating through the projection operation (P). However, the next operation, multiplication with $$\frac{\gamma}{\sigma_{\{N\}}(X_L)} (= \frac{1}{\sigma_{\{N\}}(X_L)}$$

at initialization) may re-scale the gradient norm according to the standard deviation of pre-activations along the batch dimension. For a standard, zero-mean Gaussian initialization, the pre-activations may have a standard deviation equal to $\sqrt{\pi - 1/\pi} < 1$. Thus, at initialization, the division by standard deviation operation may amplify the gradient during backward propagation. For each batch normalization layer in the model, such an amplification of the gradient may take place, hence resulting in an exponential increase in the gradient norm at earlier layers. Therefore, there may be a tradeoff in batch normalization: division by standard deviation during forward propagation, which may be important for generating dissimilar activations, may result in gradient explosion during backward propagation, thereby limiting the maximum trainable model depth.

Compared to the batch normalization, the group normalization layers may cause lesser gradient explosion during backpropagation. For example, in the group normalization layers, the gradient backpropagated through the g$^{th}$ group in a GroupNorm layer with group-size G may be expressed as:

$$\nabla_{Y_{L-1}^g}(J) = \frac{\gamma}{\sigma_{(g)}(X_L^g)} W_L^T P\left[\nabla_{\hat{X}_L^g}(J)\right].$$

Here, P may be defined as:

$$\mathcal{P}[Z] = \mathcal{P}_1^\perp\left[\mathcal{P}_{\hat{8}(\hat{x}_L/\sqrt{\sigma})}^\perp[Z]\right], \text{ where } \mathcal{P}_{\hat{8}(\hat{x}_L/\sqrt{\sigma})}^\perp[Z] = \left(I - \frac{1}{G}\hat{X}_L^g \hat{X}_L^{gT}\right)Z.$$

That is, the component of gradient inline with the normalized pre-activations may be removed via projection onto the spherical manifold defined by $\|\overline{X_L^g}\| = \sqrt{G}$. As can be seen, the gradient expressions for group normalization and batch normalization may be very similar. Hence, the discussion above for gradient explosion in batch normalization may apply to the group normalization layers as well. This may imply that when instance normalization is used in a convolutional neural network, the gradient norm for a given channel c and the i$^{th}$ sample may be amplified by the factor $$\frac{1}{\sigma_{(x)}(X_{L,i}^c)}$$

(inverse of spatial standard deviation). Then, over N samples, using the arithmetic-mean harmonic-mean inequality, the average gradient amplification in instance normalization is greater than gradient amplification in batch normalization:

$$\frac{1}{N}\Sigma_i \frac{1}{\sigma_{(x)}^2(X_{L,i}^c)} \geq \frac{N}{\Sigma_i \sigma_{(x)}^2(X_{L,i}^c)} = \frac{1}{\sigma_{(x)}^2(X_L)}.$$

Similarly applying arithmetic-mean harmonic-mean for a given sample and the g$^{th}$ group, the average gradient amplification in instance normalization may be greater than gradient amplification in the group normalization layers:

$$\frac{1}{G}\Sigma_c \frac{1}{\sigma_{(x)}^2(X_{L,i}^{g,c})} \geq \frac{G}{\Sigma_i \sigma_{(x)}^2(X_L^{g,c})} = \frac{1}{\sigma_{(x)}^2(X_L)}.$$

Extending this last inequality by averaging over N samples, the average gradient amplification in the group normalization layers may be lower than that in batch normalizations. Therefore, grouping of neurons by the group normalization layers may help reduce gradient explosion.

The initialization module 130 may randomly initialize the neural network and the training module 140 may train the randomly initialized neural network using the group normalized training data.

Although the disclosure describes group normalization on the raw data, it should be understood that the group normalization may be performed to the input data in the internal layers. For example, an upstream layer may generate an input data for a downstream layer, and a group normalization layer may be inserted in between the upstream layer and the downstream layer to group normalize the input data. In some embodiments, the group normalization layers may include an activation based layer. In some embodiments, the group normalization layers may include a parametric layer.

Figure 2:
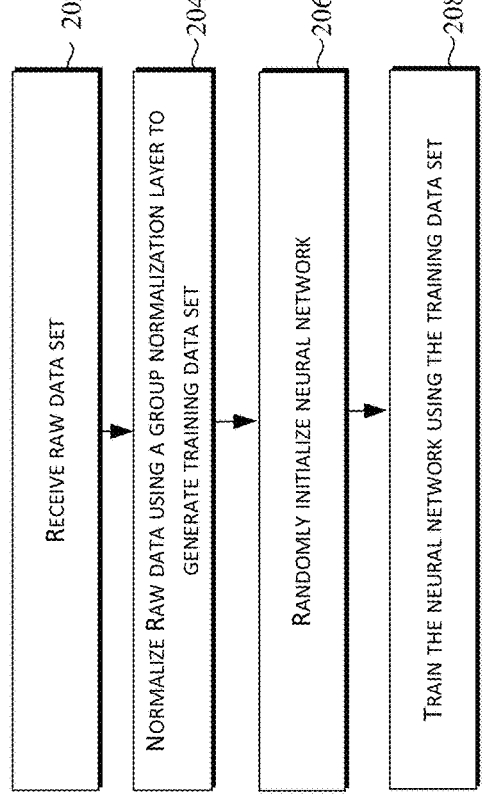
FIG. 2 shows an example method of training a neural network, according to example embodiments of this disclosure.

FIG. 2 shows an example method 200 of training a neural network, according to example embodiments of this disclosure. The method 200 may be performed by one or more components (e.g., server 102) of the system shown in FIG. 1.

The method 200 may begin at step 202, where the server 102 may receive a raw data set. The raw data set may include any kind of data set such as image data set, text data set, audio data set, etc.

At step 204, the server 102 may normalize the raw data using a group normalization layer to generate a training data set. To generate the training data set, the normalization layer may segment the raw data set into a plurality of groups of a predetermined size.

At step 206, the server 102 may randomly initialize a neural network by randomly assigning values to a plurality a plurality of weights corresponding to a plurality of layers of the neural network. In some embodiments, the neural network may include a deep neural network. In some embodiments, the neural network may include a convolutional neural network.

At step 208, the server 102 may train the neural network using the training data set. As the training data set is normalized, the training may prevent problems such as activation explosion during forward propagation, gradient explosion during backward propagation, and rank collapse in one or more internal layers of the neural network.

Figure 3:
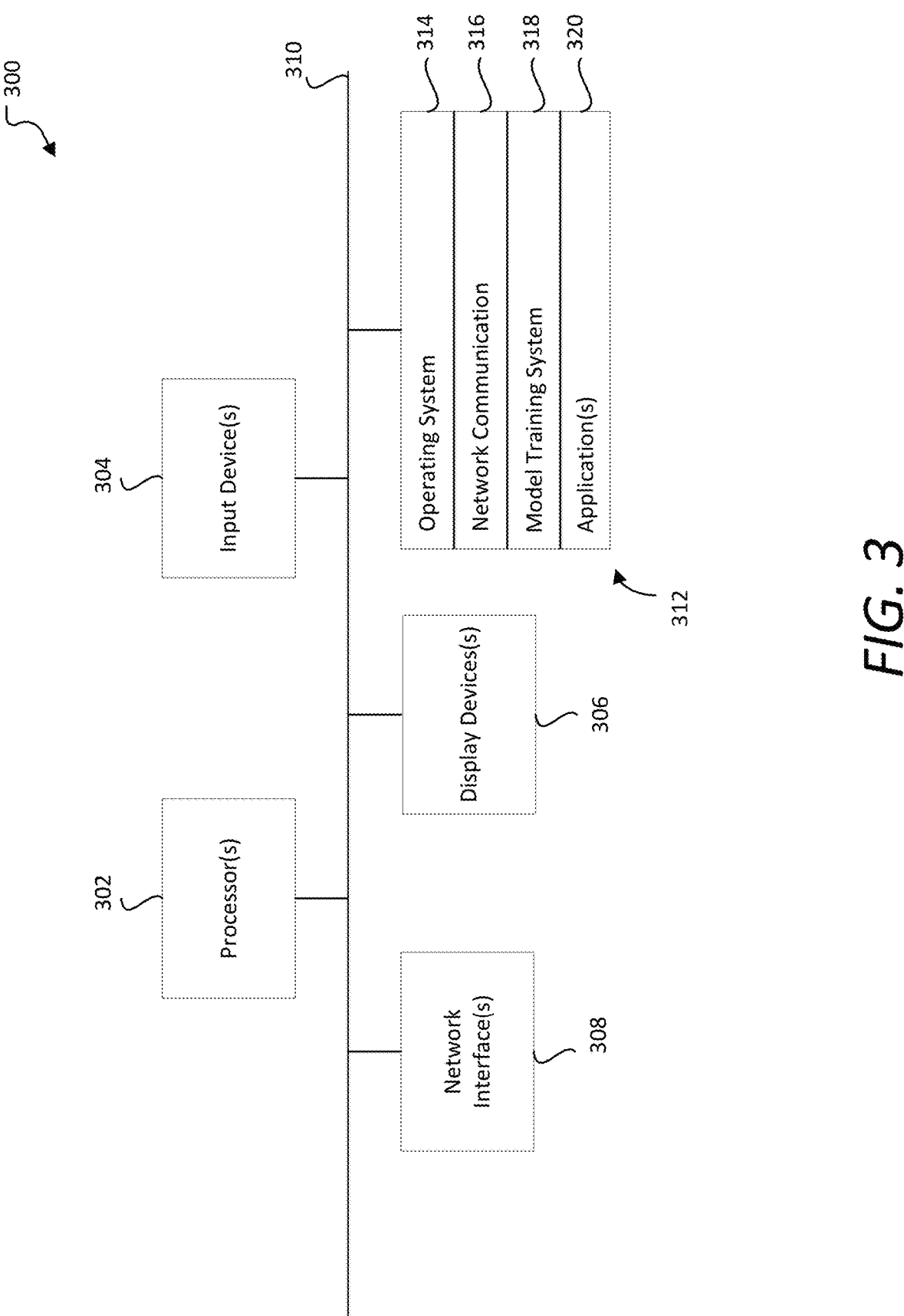
FIG. 3 shows a block diagram of an example computing device that implements various features and processes, according to example embodiments of this disclosure.

FIG. 3 shows a block diagram of an example computing device 300 that implements various features and processes, according to example embodiments of this disclosure. For example, computing device 300 may function as the server 102, the clients 106, or a portion or combination thereof in some embodiments. The computing device 300 may also perform one or more steps of the method 200. The computing device 300 is implemented on any electronic device that runs software applications derived from compiled instructions, including without limitation personal computers, servers, smart phones, media players, electronic tablets, game consoles, email devices, etc. In some implementations, the computing device 300 includes one or more processors 302, one or more input devices 304, one or more display devices 306, one or more network interfaces 308, and one or more computer-readable media 312. Each of these components is be coupled by a bus 310.

Display device 306 includes any display technology, including but not limited to display devices using Liquid Crystal Display (LCD) or Light Emitting Diode (LED) technology. Processor(s) 302 uses any processor technology, including but not limited to graphics processors and multi-core processors. Input device 304 includes any known input device technology, including but not limited to a keyboard (including a virtual keyboard), mouse, track ball, and touch-sensitive pad or display. Bus 310 includes any internal or external bus technology, including but not limited to ISA, EISA, PCI, PCI Express, USB, Serial ATA or FireWire. Computer-readable medium 312 includes any non-transitory computer readable medium that provides instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 312 includes various instructions 314 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 304; sending output to display device 306; keeping track of files and directories on computer-readable medium 312; controlling peripheral devices (e.g., disk drives, printers, etc.) which can be controlled directly or through an I/O controller; and managing traffic on bus 310. Network communications instructions 316 establish and maintain network connections (e.g., software for implementing communication protocols, such as TCP/IP, HTTP, Ethernet, telephony, etc.).

Model training system instructions 318 includes instructions that implement the disclosed processes for training the neural networks, as described throughout this disclosure. Application(s) 320 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

The method steps discussed herein are provided as just examples and should not be considered limiting. Methods with alternative, additional, or fewer number of steps are to be considered within the scope of this disclosure. Furthermore, the steps are numbered merely for identification and the numbering is meant neither to convey a limitation to the shown discrete steps nor a limitation to the shown sequence of the steps.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of training a neural network, the method comprising:

receiving a raw data set;

normalizing the raw data set using a group normalization layer to generate a training data set for training a neural network, wherein the group normalization layer segments the raw data set into a plurality of groups of a predetermined size;

randomly initializing the neural network by randomly assigning values to a plurality of weights corresponding to a plurality of layers of the neural network; and training the neural network using the training data set.

2. The method of claim 1, wherein the group normalization layer comprises an activation based layer.

3. The method of claim 1, wherein the group normalization layer comprises a parametric layer.

4. The method of claim 1, further comprising:

causing, by the group normalization layer, a linear growth of activation variance during a forward propagation within the neural network.

5. The method of claim 1, further comprising:

causing, by a non-linearity in a residual path of the neural network, a linear growth of activation variance during a forward propagation within the neural network.

6. The method of claim 1, further comprising:

preventing, by the group normalization layer, a rank collapse within at least one internal layer of the neural network.

7. The method of claim 1, further comprising:

avoiding, by the group normalization layer, gradient explosion during a backward propagation within the neural network.

8. The method of claim 1, further comprising:

determining the size based on training speed and training stability of the neural network.

9. The method of claim 1, wherein the neural network comprises a deep neural network.

10. The method of claim 1, wherein the neural network comprises a convolutional neural network.

11. A system comprising:

a non-transitory storage medium storing computer program instructions; and one or more processors configured to execute the computer program instructions to cause operations comprising:

receiving a raw data set;

normalizing the raw data set using a group normalization layer to generate a training data set for training a neural network, wherein the group normalization layer segments the raw data set into a plurality of groups of a predetermined size;

randomly initializing the neural network by randomly assigning values to a plurality of weights corresponding to a plurality of layers of the neural network; and training the neural network using the training data set.

12. The system of claim 11, wherein the group normalization layer comprises an activation based layer.

13. The system of claim 11, wherein the group normalization layer comprises a parametric layer.

14. The system of claim 11, wherein the operations further comprise:

causing, by the group normalization layer, a linear growth of activation variance during a forward propagation within the neural network.

15. The system of claim 11, wherein the operations further comprise:

causing, by a non-linearity in a residual path of the neural network, a linear growth of activation variance during a forward propagation within the neural network.

16. The system of claim 11, wherein the operations further comprise:

preventing, by the group normalization layer, a rank collapse within at least one internal layer of the neural network.

17. The system of claim 11, wherein the operations further comprise:

avoiding, by the group normalization layer, gradient explosion during a backward propagation within the neural network.

18. The system of claim 11, wherein the operations further comprise:

determining the size based on training speed and training stability of the neural network.

19. The system of claim 11, wherein the neural network comprises a deep neural network.

20. The system of claim 11, wherein the neural network comprises a convolutional neural network.

* * * * *